US009323681B2

(12) United States Patent
Apostolides et al.

(10) Patent No.: US 9,323,681 B2
(45) Date of Patent: Apr. 26, 2016

(54) FILE STORAGE SYSTEM, CACHE APPLIANCE, AND METHOD

(75) Inventors: Vasilis J. Apostolides, Wexford, PA (US); Jason Bertschi, Flint, MI (US); John R. Boyles, Cranberry Township, PA (US); Joseph Nevi Hosteny, IV, Pittsburgh, PA (US); Michael L. Kazar, Pittsburgh, PA (US)

(73) Assignee: Avere Systems, Inc., Pittsburgh, PA (US)

(*) Notice: Subject to any disclaimer, the term of this patent is extended or adjusted under 35 U.S.C. 154(b) by 1260 days.

(21) Appl. No.: 12/283,961

(22) Filed: Sep. 18, 2008

(65) Prior Publication Data

US 2010/0094806 A1 Apr. 15, 2010

(51) Int. Cl.
*G06F 17/30* (2006.01)
*G06F 12/08* (2006.01)

(52) U.S. Cl.
CPC ........ *G06F 12/0866* (2013.01); *G06F 12/0815* (2013.01); *G06F 12/0804* (2013.01); *G06F 2212/264* (2013.01); *G06F 2212/284* (2013.01); *G06F 2212/314* (2013.01); *G06F 2212/463* (2013.01)

(58) Field of Classification Search
CPC .................. G06F 2221/0711; G06F 17/30067
USPC ................... 707/769, 716; 713/185; 709/248
See application file for complete search history.

(56) References Cited

U.S. PATENT DOCUMENTS

| 7,814,058 B2 * | 10/2010 | Beck .............................. 707/649 |
| 2003/0028514 A1 * | 2/2003 | Lord et al. .................... 707/707 |
| 2003/0078946 A1 * | 4/2003 | Costello et al. ............... 707/201 |

(Continued)

*Primary Examiner* — Robert Beausoliel, Jr.
*Assistant Examiner* — Alexandria Bromell
(74) *Attorney, Agent, or Firm* — Ansel M. Schwartz

(57) ABSTRACT

A file storage system for storing data of a file received from a client includes a back-end file server in which the data is stored. The system includes a cache appliance in communication with the file server, such that the appliance stores portions of the data or attributes of the file, and uses the stored data or attributes to process file system requests received from the client, and which reads and writes data and attributes to the back-end file server independently. A system for responding to a file system protocol request in regard to a back-end server includes a token server. The system includes a plurality of cache appliances in communication with the token server, each of which receives tokens from the token server to synchronize access to data and attributes caches of the cache appliances, and reading and writing data and attributes to the back-end servers when tokens are revoked, the cache appliance having persistent storage in which data are stored, and the token server having persistent storage in which tokens are stored. A storage system includes a plurality of backend servers. The system includes a token server which grants permission to read and write file attributes and data system, and includes a plurality of cache appliances in communication with at least one of the backend servers and the token server for processing an incoming NFS request to the one backend server. Each cache appliance comprises an NFS server which converts incoming NFS requests into cache manager operations; a token client module in communication with the token server having a cache of tokens obtained from the token server; a cache manager that caches data and attributes and uses tokens from the token client module to ensure that the cached data or attributes are the most recent data or attributes, and an NFS client which sends outgoing NFS requests to the back-end file server. Methods for storing data of a file received from a client.

16 Claims, 7 Drawing Sheets

APPLIANCE FAILOVER

(56) References Cited

U.S. PATENT DOCUMENTS

| | | | |
|---|---|---|---|
| 2004/0139125 A1* | 7/2004 | Strassburg et al. | 707/202 |
| 2004/0143607 A1* | 7/2004 | Beck | 707/201 |
| 2004/0153841 A1* | 8/2004 | Beck | 714/42 |
| 2004/0210656 A1* | 10/2004 | Beck et al. | 709/225 |
| 2004/0210673 A1* | 10/2004 | Cruciani et al. | 709/246 |
| 2004/0249904 A1* | 12/2004 | Moore et al. | 709/216 |
| 2004/0250113 A1* | 12/2004 | Beck | 713/201 |
| 2005/0015384 A1* | 1/2005 | Wehrman et al. | 707/100 |
| 2006/0050870 A1* | 3/2006 | Kimmel et al. | 380/30 |
| 2008/0271130 A1* | 10/2008 | Ramamoorthy | 726/9 |
| 2009/0012817 A1* | 1/2009 | Squires et al. | 705/3 |
| 2009/0019047 A1* | 1/2009 | Anderson et al. | 707/8 |
| 2009/0019098 A1* | 1/2009 | Gunda et al. | 707/205 |
| 2009/0031131 A1* | 1/2009 | Qiu et al. | 713/172 |
| 2009/0113543 A1* | 4/2009 | Adams et al. | 726/18 |
| 2009/0307755 A1* | 12/2009 | Dvorak et al. | 726/4 |
| 2010/0094806 A1* | 4/2010 | Apostolides et al. | 707/637 |
| 2014/0108049 A1* | 4/2014 | Fuhrmann et al. | 705/3 |

* cited by examiner

FILE STORAGE SYSTEM, CACHE APPLIANCE, AND METHOD

FIELD OF THE INVENTION

The present invention is related the data storage involving cache appliances and back-end servers where the cache appliances operate independently of the back end servers to which they store the data. (As used herein, references to the "present invention" or "invention" relate to exemplary embodiments and not necessarily to every embodiment encompassed by the appended claims.) More specifically, the present invention is related the data storage involving cache appliances and back-end servers where the cache appliances operate independently of the back end servers to which they store the data and which use tokens to synchronize access to data and attributes caches of the cache appliances.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Caching appliances make one or more copies of the data stored on a Network-attached storage (or NAS) file server, based upon the data being recently accessed, with the goal of accelerating access to that data, as well as reducing the load placed on the server by the NAS clients. But caching appliances, in their current implementation are limited both in the types of operations that they can offload from the back-end file servers, and in their scalability in a data center environment. Scalability is especially important in those environments where applications can run on any physical system within a large cloud of compute servers, each acting as a NAS client, and thus where there may be thousands, or more, clients communicating with a small number of NAS file servers. This invention addresses these scaling and performance issues, as described below.

There have been a number of network file system caching devices released over the years. The first release of the Andrew file system, in 1984, performed disk-based caching, and NFS clients 20, from their first days, contained memory resident caches. The NFS/AFS translator, a product from IBM Transarc Labs, supported caching of NFS files stored in an AFS global file system. All of these systems made local copies of data stored on a back-end file server (an AFS server in the NFS/AFS translator example), and service incoming NFS requests both with the assistance of the cached data and making requests to the back-end file server. File system caches are partially categorized by how they process write operations. They operate either in write-through mode, where every incoming write operation is forwarded back to the back-end file server before being acknowledged, or in write-back mode, where incoming write operations may be acknowledged by the cache appliance before the data is actually written to the back-end file server. Write-through caches are simpler, since they use simpler techniques to ensure that all caches see the latest written data, and to ensure that in the event of multiple crashes, no acknowledged data is ever discarded.

All of the systems discussed above perform write-through caching, to ensure NFS's "close to open" semantics are met, guaranteeing that a file open, performed after a program writing a file closes its file, will see the most recently written data. These systems also aggressively write data through to the server to ensure data persistence in the event of a crash of the caching system.

Gear6 provides a pure memory cache with a global directory maintaining a single copy of each piece of cached data in one of the cluster appliances, but it, too, writes data back to the back-end file server aggressively, partially to ensure persistence. Gear6 appliances also verify that cached data is up-to-date on many references because Gear6 recommends that write-heavy loads go directly to the back-end filer to improve overall system performance.

BRIEF SUMMARY OF THE INVENTION

The present invention pertains to a file storage system for storing data of a file received from a client. The system comprises a back-end file server in which the data is stored. The system comprises a cache appliance in communication with the file server, such that the appliance stores portions of the data or attributes of the file, and uses the stored data or attributes to process file system requests received from the client, and which reads and writes data and attributes to the back-end file server independently.

The present invention pertains to a system for responding to a file system protocol request in regard to a back-end server. The system comprises a token server. The system comprises a plurality of cache appliances in communication with the token server, each of which receives tokens from the token server to synchronize access to data and attributes caches of the cache appliances, and reading and writing data and attributes to the back-end servers when tokens are revoked, the cache appliance having persistent storage in which data are stored, and the token server having persistent storage in which tokens are stored.

The present invention pertains to a method for storing data of a file received from a client. The method comprises the steps of storing portions of the data or attributes of the file in a cache appliance. There is the step of using the stored data or attributes to process file system requests received from the client. There is the step of reading and writing the data and the attributes to the back-end file server independently.

The present invention pertains to a method for responding to a file system protocol request to access data stored by a back-end server. The method comprises the steps of receiving tokens from a token server at a plurality of cache appliances in communication with the token server. There is the step of synchronizing access to data caches and attributes caches of the cache appliances with the tokens [this step is performed by the token server]. There is the step of writing data in the data caches and attributes in the attributes caches to a back-end server when the tokens are revoked, the cache appliance having persistent storage in which the data are stored, and the token server having persistent storage in which tokens are stored.

The present invention pertains to a storage system. The system comprises a plurality of backend servers. The system comprises a token server which grants permission to read and write file attributes and data. The system comprises a plurality of cache appliances in communication with at least one of the backend servers and the token server for processing an incoming NFS request to the one backend server. Each cache appliance comprises an NFS server which converts incoming NFS requests into cache manager operations; a token client module in communication with the token server having a cache of tokens obtained from the token server; a cache manager that caches data and attributes and uses tokens from the token client module to ensure that the cached data or attributes are the most recent data or attributes, and an NFS client which sends outgoing NFS requests to the back-end file server.

The present invention pertains to a method for storing data. The method comprises the steps of processing an incoming NFS request with a cache appliance of a plurality of cache appliances in communication with at least one of a plurality of backend servers. Each cache appliance comprises an NFS server which converts incoming NFS requests into cache manager operations; a token client module in communication with the token server having a cache of tokens obtained from the token server; a cache manager that caches data and attributes and uses tokens from the token client module to ensure that the cached data or attributes are the most recent data or attributes, and an NFS client which sends outgoing NFS requests to the back-end file server. There is the step of the cache appliance's obtaining permission from a token server to read and write file attributes and data.

This invention addresses the costs of cache validation, by means of a synchronization mechanism to ensure that all references to a cached file are up-to-date, even when a file is written through multiple cache appliances concurrently. The synchronization mechanism passes out "tokens" or distributed locks, to cache appliances, with lock conflict rules that trigger cache invalidations on the desired cache appliances when another cache appliance updates the same file. When a token incompatible with an already outstanding token is to be granted, the original token is first revoked. When an appliance holds the correct synchronization token, it has no need to verify the correctness of its cache by communicating with the back-end file server.

The use of these synchronization tokens also allows this invention to address the cache scalability issue, since the invention's ability to coordinate the cache contents across multiple cache appliances allows the safe and efficient use of multiple cache appliances to cache data from the same back-end file server, while still providing the NFS protocol's "close to open" synchronization semantics.

While systems like the aforementioned AFS/NFS, and a related DFS/NFS translator used similar token-based mechanisms for coordinating the contents of the cache contents, the extensions below greatly increase the utility of the token management scheme.

This invention is believed to improve on the state of the art for caching appliances, as it avoids the cost of mandatory write-through operations to guarantee data persistence. It does this through a combination of the use of persistent tokens to track and lock out concurrent access to modified data, even in the presence of arbitrary system crashes, and the use of individual file mirroring to ensure that all modified data is present on multiple caching appliances. The combination of these approaches allows the appliance complete flexibility as to when to write modified data back to the back-end file server.

This invention is believed to also improve on the start of the art for caching appliances by providing a mechanism to mirror updated data and the corresponding token state to a spare appliance, to guard against the failure of a cache appliance with data that has not yet been written to the back-end file server. This mechanism mirrors preferably only write tokens, and provides an even more robust and efficient mechanism for dealing with read tokens on a failed cache appliance.

This invention is believed to also improve on the state of the art in caching appliances by greatly reducing latency for operations that fail to locate data and tokens in the cache, through a mechanism, described below, called ghost tokens, which allow synchronization tokens to be obtained from a token server concurrently with obtaining the corresponding file's attributes from the back-end file server in the case of a cache miss.

This invention is believed to improve upon the state of the art for caching appliances for accessing heavily shared files via a batch token mechanism. Under normal token conflict rules, every write operation that updates a file should invalidate the file's cached attributes in every appliance in the cluster. However, with the batch token extension, multiple write operations can be satisfied with a single invalidation step, allowing much higher throughput rates for accesses to heavily shared cached files.

This invention avoids the need to store data at the back-end during the transition from having a single write copy cached, to having multiple read copies cached, or in a transition from having a write copy cached on one machine, to having a write copy cached at another machine, by allowing appliances to coordinate the exchange of modified data directly from one cache to another by means of more sophisticated token locking mechanism than has been used in past caching systems.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
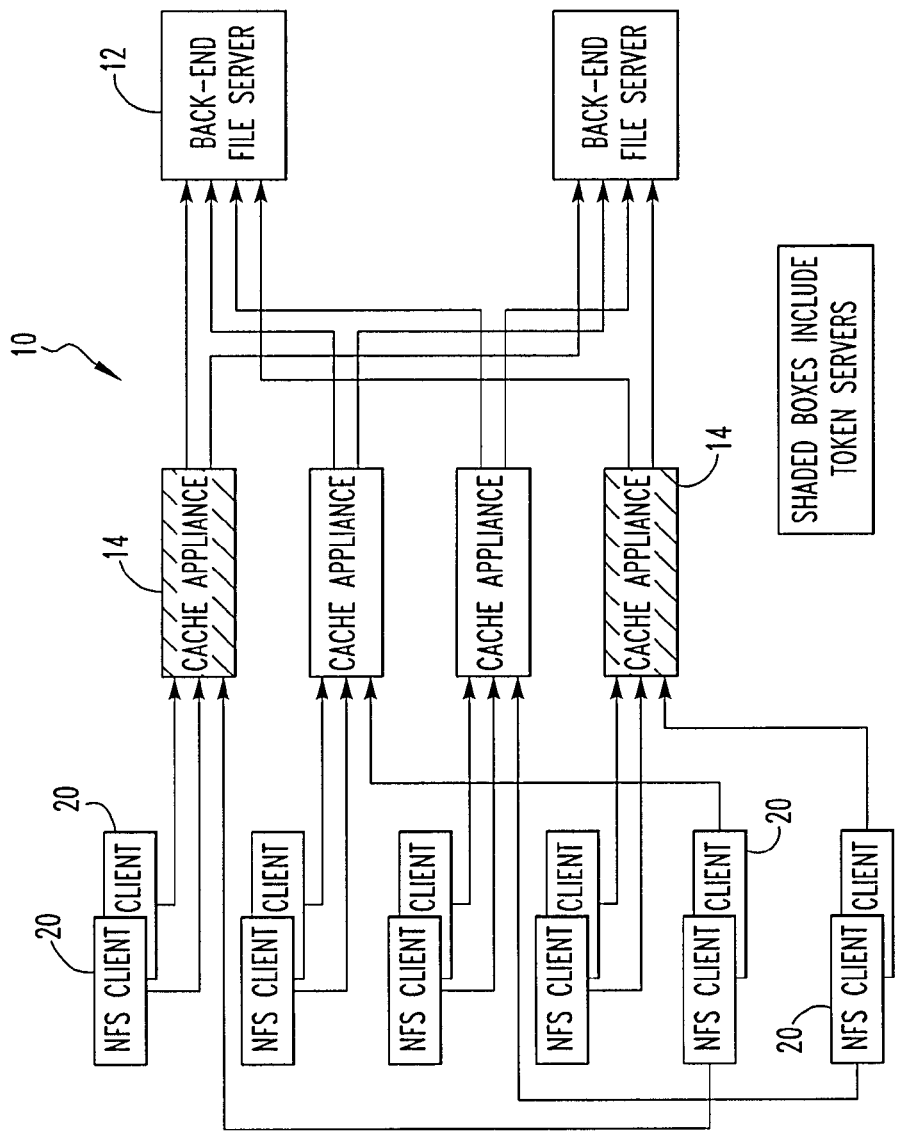
FIG. 1 is a block diagram showing the general deployment context of the present invention.
Figure 2:
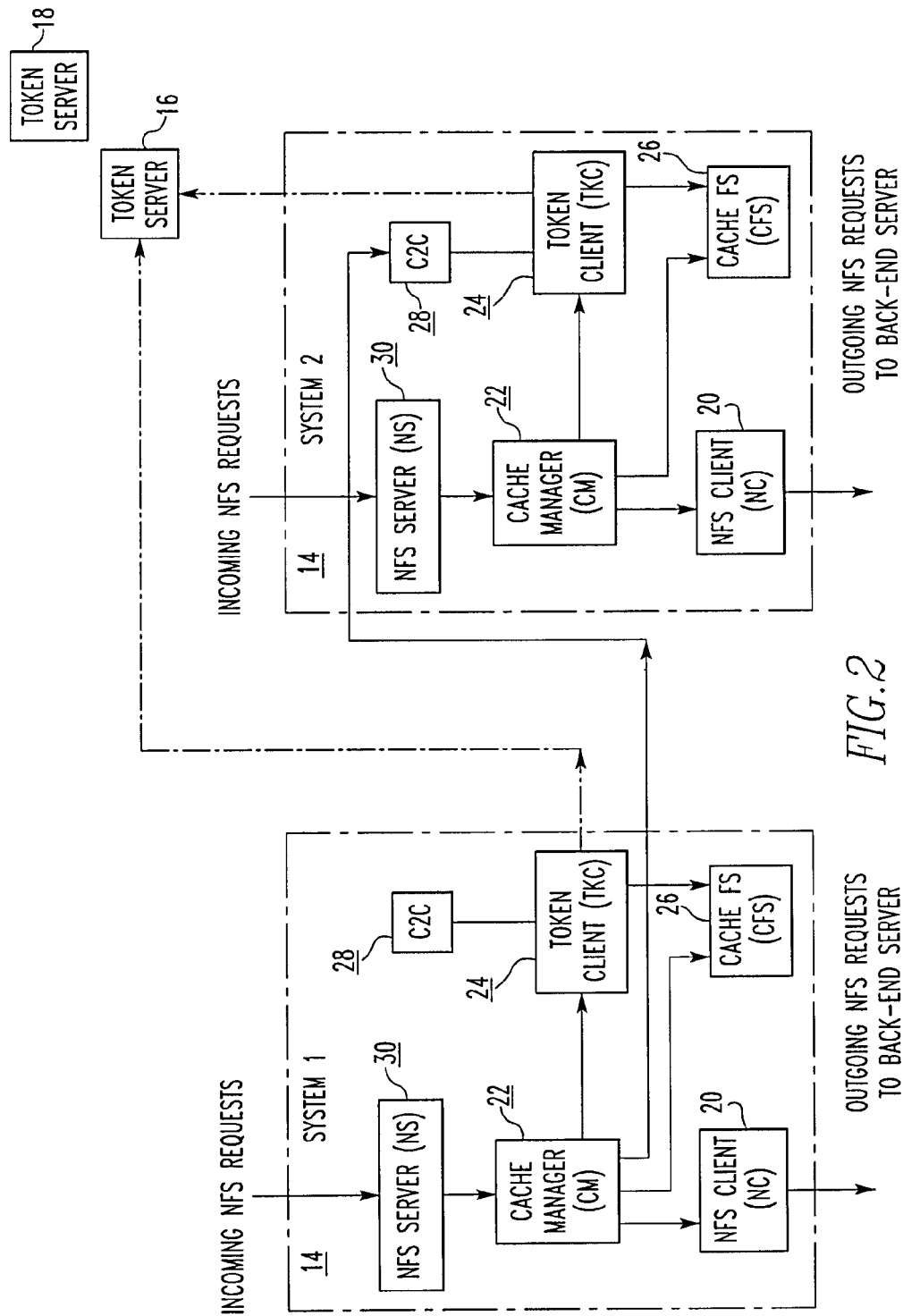
FIG. 2 is a block diagram of a cache appliance of the present invention.

Referring now to the drawings wherein like reference numerals refer to similar or identical parts throughout the several views, and more specifically to FIGS. 1 and 2 thereof, there is shown a file storage system 10 for storing data of a file received from a client. The system 10 comprises a back-end file server 12 in which the data is stored. The system 10 comprises a cache appliance 14 in communication with the file server 12, such that the appliance 14 stores portions of the data or attributes of the file, and uses the stored data or attributes to process file system 10 requests received from the client, and which reads and writes data and attributes to the back-end file server 12 independently.

The present invention pertains to a system 10 for responding to a file system 10 protocol request in regard to a back-end server 12. The system 10 comprises a token server 16. The system 10 comprises a plurality of cache appliances 14 in communication with the token server 16, each of which receives tokens from the token server 16 to synchronize access to data and attributes caches of the cache appliances 14, and reading and writing data and attributes to the back-end servers 12 when tokens are revoked, the cache appliance 14 having persistent storage in which data are stored, and the token server 16 having persistent storage in which tokens are stored.

Preferably, the token server 16 produces a write data token to enable a cache appliance 14 to perform a write operation to data stored at the back-end server 12, and ensures that no two write data tokens are granted over a single byte of any same file. The token server 16 preferably produces write attribute tokens to enable a cache appliance 14 to perform operations updating file attributes for files stored in the back-end server 12, and ensures that no two write attribute tokens are granted for the same file, and wherein the token server 16 revokes an already granted write data or write attribute token by revoking the granted write data or write attribute token if a new write data or write attribute token is requested from the token server 16 and is incompatible with the already granted write attribute or write data token. The system 10 can include a spare token server 18 where the write data tokens and write attribute tokens are mirrored. The system 10 can include another cache appliance 14 where modified data and modified attributes are persistently stored.

Preferably, the token server 16 produces read data tokens and read attribute tokens that have a per token expiration time which allows them to be unilaterally revoked by the token server 16 after the expiration time has passed. The token server 16 preferably produces ownership tokens for the cache appliance 14 for the file's attributes and data, and data and attributes associated with the ownership tokens are retrieved directly from the cache appliance 14 having the ownership token.

The token server 16 can produce a ghost token persisting for a time period during which the token server 16 indicates a last time in which a write data or attribute token was held for the file. The token server 16 can produce batch tokens to reduce communication with the token server 16 for shared files. Dual logs, or a circular log, can be used to store tokens persistently at the token server 16. A token server 16 can be chosen by a function including a file handle as a parameter, which maps the file handle to a plurality of token servers 16, with a plurality of token servers 16 in communication with the plurality of cache appliances 14. The protocol used to communicate with the back-end file server 12 can be NFS.

The present invention pertains to a method for storing data of a file received from a client. The method comprises the steps of storing portions of the data or attributes of the file in a cache appliance 14. There is the step of using the stored data or attributes to process file system 10 requests received from the client. There is the step of reading and writing the data and the attributes to the back-end file server 12 independently of the back-end server 12.

The present invention pertains to a method for responding to a file system 10 protocol request pertaining to file data or attributes stored at a back-end server 12. The method comprises the steps of receiving tokens from a token server 16 at a plurality of cache appliances 14 in communication with the token server 16. There is the step of synchronizing access to data caches and attributes caches of the cache appliances 14 with the tokens. There is the step of writing data in the data caches and attributes in the attributes caches to a back-end server 12 when the tokens are revoked, the cache appliance 14 having persistent storage in which the data are stored, and the token server 16 having persistent storage in which tokens are stored.

There is preferably the step of producing a write data token by the token server 16 for files stored at the back-end server 12 to enable a cache appliance 14 to perform write operations locally, the token server 16 ensuring that no two write data tokens are granted over a single byte of any same file. Preferably, there is the step of producing write attribute tokens by the token server 16 for files stored in the back-end server 12, the token server 16 ensuring that no two write attribute tokens are granted for the same file. There is preferably the step of the token server 16 revoking an already granted write data or write attribute token by recalling the granted write data or write attribute token if a new write data or write attribute token is requested from the token server 16 and is incompatible with the already granted write attribute or write data token.

There can be the step of mirroring in a spare token server 18 the write data tokens and write attribute tokens. There can be the step of persistently storing in another cache appliance 14 modified data and modified attributes. There can be the step of producing with the token server 16 read data tokens and read attribute tokens that have a per token expiration times which allows them to be unilaterally revoked by the token server 16 after the expiration time has passed. There can be the step of producing with the token server 16 ownership tokens for the cache appliance 14 for the file's attributes and data. There can be the step of retrieving directly from the cache appliance 14 data and attributes associated with file associated with the ownership token.

There can be the step of the token server 16 producing a ghost token persisting for a time period during which the token server 16 indicates a last time at which a write data or attribute token was held for the file. There can be the step of the token server 16 producing batch tokens to reduce communication with the token server 16 for shared files. There can be the step of choosing the token server 16 by a function which includes a file handle as a parameter, which maps the file handle to a plurality of token servers 16. There can be the steps of leasing the read data tokens and read attribute tokens and automatically revoking when their lease expires.

The present invention pertains to a storage system 10. The system 10 comprises a plurality of backend servers 12. The system 10 comprises a token server 16 which grants permission to read and write file attributes and data. The system 10 comprises a plurality of cache appliances 14 in communication with at least one of the back-end servers 12 and the token server 16 for processing an incoming NFS request to the one back-end server 12. Each cache appliance 14 comprises an NFS server which converts incoming NFS requests into cache manager 22 operations; a token client 24 module in communication with the token server 16 having a cache of tokens obtained from the token server 16; a cache manager 22 that caches data and attributes and uses tokens from the token client 24 module to ensure that the cached data or attributes are the most recent data or attributes, and an NFS client 20 which sends outgoing NFS requests to the back-end file server 12.

Preferably, the system 10 includes a cache file system in communication with the cache manager 22 which stores copies of file attributes and file data and directory listing information. The system 10 preferably includes a C2C 28 interface which accesses data and attributes in other cache appliances 14.

The NFS server element is a module that receives incoming NFS requests (as described by IETF RFC 1813) from the clients, and calls into the cache manager 22 module to perform the underlying operation. The NFS client 20 element is a module that sends outgoing NFS requests to the back-end file server 12, in order to read data into the cache from the back-end file server 12, to write data to the back-end file server 12 from the cache, or to perform directory reading or modifying operations to the back-end file server 12 on behalf of the cache appliance 14.

The present invention pertains to a method for storing data. The method comprises the steps of processing an incoming NFS request with a cache appliance of a plurality of cache appliances 14 communicating with at least one of a plurality of back-end servers 12. Each cache appliance 14 comprises an NFS server which converts incoming NFS requests into cache manager 22 operations; a token client 24 module in communication with the token server 16 having a cache of tokens obtained from the token server 16; a cache manager 22 that caches data and attributes and uses tokens from the token client 24 module to ensure that the cached data or attributes are the most recent data or attributes, and an NFS client 20 which sends outgoing NFS requests to the back-end file server 12. There is the step of obtaining permission by the cache appliance 14 from a token server 16 to read and write file attributes and data.

Preferably, there is the step of storing copies of file attributes and file data and directory listing information in a cache file system in communication with the cache manager 22. There is preferably the step of accessing data and attributes in other cache appliances 14 using a C2C 28 interface of the cache appliance 14.

In the operation of the invention, a clustered caching appliance 14 is deployed, as shown in FIG. 1.

In FIG. 1, requests arrive at a collection of cache appliances 14 from a collection of NFS clients 20, each communicating using the NFS protocol, and each accessing a cache appliance 14 with connectivity to several back-end NFS file servers. When a request arrives at a cache appliance 14, if the data and attributes being accessed is present in that appliance 14, and the request is a read operation of some form (that is, an operation that does not change the data it accesses), then the request is handled by that appliance 14 directly, without the participation of the back-end file servers 12.

Write requests are more complex. A write request, updating either a file's attributes or data, should simultaneously invalidate any cached copies of the data it is about to update elsewhere in the cache appliance 14 collection, and update the data locally within the cache appliance 14. In addition, there are redundancy modes that may have been configured that desire sending a copy of the data to one or more other cache appliances 14.

Furthermore, the appliance 14 administrator may have configured a policy concerning how much, or how long, modified data may be stored in a caching appliance 14 before the cache appliance 14 should write the modifications back to the back-end server 12. These policies may require the cache appliance 14 to immediately write some subset of data back to its home in the back-end server 12 before completing the write request.

Finally, the system 10 may be configured for high availability (HA) operation, in which the loss of a cache appliance 14 should be hidden from the accessing NFS client 20. When configured for HA operation, every update, including every write operation, should be propagated to a second cache appliance 14 before the update operation is acknowledged.

As noted above, multiple copies of the same data may be present in multiple cache appliances 14, and this invention provides a mechanism to ensure cache coherence when data is updated at a cache appliance 14. This mechanism is a token-based cache synchronization mechanism, with specific tokens representing the right to read or write either a particular file's attributes, or a byte range of the file's data; in addition, there are attribute tokens called batch tokens designed to handle multiple concurrent writers, and which are described below. All of these tokens are issued by a token server 16, with a token server 16 group consisting of a single token server 16, plus any number of standby token servers 16, coordinating access to a predetermined collection of files. This invention may make use of multiple token server 16 groups; for example, the system 10 may choose to divide the entire set of cached files into multiple groups based on a random hash on the files' file handles.

The token server 16 ensures that no two data tokens are granted over the same byte of the same file, unless they are both read tokens, and that no two attribute tokens are granted for the same file unless they are both read tokens. If a token is requested from a token server 16, and the new token is incompatible with an already granted token, the token server 16 revokes the already granted token by calling back to the owner of the outstanding token, and requesting that it return the incompatible token.

Write tokens are also stored persistently, to ensure that in the event of the crash of an arbitrary number of cache appliances 14 and token servers 16, no appliance 14 can read or update modified data whose only copy resides on a failed cache appliance 14. To improve overall system 10 availability these write tokens may be mirrored to a spare token server 18, while the modified data may be simultaneously mirrored to another cache appliance 14, to ensure that the data and its related tokens are available after the loss of a cache appliance 14. Because both write tokens and modified data are stored persistently, the invention never loses track of modified data, no matter how many system 10 restarts occur. This allows the cache appliance 14 great latitude to choose the best time to write data to the back-end file servers 12.

Note that read tokens are treated significantly differently from write tokens. While write tokens are stored persistently and without any expiration time, read tokens need not be stored persistently, and are associated with a per-token expiration time, so that if a communication or node failure occurs, all read tokens granted to a cache appliance 14 can be unilaterally revoked by the token server 16 after the expiration time passes. This difference in token treatment in the presence of cache appliance 14 failures greatly reduces the impact of a cache appliance 14 failure on the system 10, since after a short timeout, tokens conflicting with previously outstanding read tokens can be granted again.

The invention also makes an improvement over the state of the art in the case where file sharing between cache appliances 14 is occurring. When one cache appliance 14 reads data cached and modified by another appliance 14, in current state of the art systems, the cache appliance 14 holding modified data should store the data back to the back-end file server 12 before the second appliance 14 can serve the data to its client. In this invention, however, there is the concept of an ownership token, at the same granularity as a write token. When an appliance 14 holds an ownership token, whether for a file's attributes, or for a subset of its data, the other appliances 14 know to retrieve the data covered by the token directly from the "owning" appliance 14 instead of from the back-end server 12. Thus, a cache appliance 14 holding modified data could, upon a revoke of the write token, simply exchange the write token for an ownership token, instead of writing the data back to the back-end file server 12. From that point on, the cache appliance 14 holding the modified data would be unable to make further changes to the covered data. Another cache appliance 14 reading that data could get a read token, and then read the data from the appliance 14 holding the ownership token, avoiding communication with the back-end file server 12 entirely.

Through the use of the ownership tokens described by this invention, there is no strict requirement to store data to the back-end file server 12 at any given time, allowing the performance of the combined cache and back-end file server 12 for both reading and writing user data to be completely determined by the performance of the cache appliances 14 alone. This is a significant improvement in the state of the art of distributed file system 10 caching.

FIG. 2 shows a detailed modular decomposition of the cache appliance 14. A separate token server 16 module is shown, but the token server 16 actually runs in the preferred implementation on several of the cache appliance 14 systems, as a separate process on the same machine.

The NFS server (NS) module is an implementation of the server side of the NFS protocol, as specified by the IETF's RFC 1813, available from the IETF at ietf.org, and implemented in OpenSolaris, FreeBSD and other open operating systems. These implementations are written to and provide a virtual file system "vnode" interface, and can be used directly in this invention.

Similarly, the NFS client 20 (NC) module is a straightforward implementation of the client side of the same NFS protocol, as found in Open Solaris, FreeBSD or other operating systems. It receives calls using the standard vnode interface present in OpenSolaris, FreeBSD or other operating systems, and sends out NFS RPC calls to the back-end NFS file server.

The cache file system 26 (also called CFS or Cache FS) is a straightforward local file system, storing file attributes and file data, as well as directory listing information, for the cache appliance 14. It can be implemented on top of any local file system present in the FreeBSD or OpenSolaris kernel, including the UFS or FFS file systems. An extra bit per cached file can be stored, in the Unix mode bits, to indicate whether the data stored in the file is dirty (i.e. has been modified locally and thus is to be stored back to the back-end file server 12 at some point), or is clean, and can be discarded by the cache appliance 14 at any time necessary to free up space in the cache appliance 14. The cache file system 26 stores two types of information, file attributes, and file data. File attributes are stored in a file named "A<filehandle>" where "A" is the letter 'A', and <filehandle> is the NFS file handle of the file whose attributes are being cached represented as a hexadecimal number. The contents of this file store the file attributes described in the NFS specification, along with a dirty bit for each field indicating whether the particular attribute is to be stored back at the back-end file server 12. File data is broken down into chunks of data, the size of which can be chosen dynamically, a typical size being 1 MB. Data chunks are stored in separate files, each named "D<offset>.<filehandle>". There is a dirty bit for each chunk, stored in the Unix mode bits (the "1" bit of st_mode), which indicates that the data in this chunk is to be stored back to the back-end file server 12. The files in this file system are not accessed directly by NFS, but instead this data is used by the cache manager 22 (CM) module described below, when incoming requests are handled. Each data chunk also stores a datamod time, initially equal to the modification time for the file at the time the chunk was or written from the back-end file server 12.

This invention uses tokens to coordinate the actions of multiple cache appliances 14 accessing the same data from the back-end file server 12. Since multiple cache appliances 14 can cache the same data, the invention should ensure that different appliances 14 do not make modifications to the same data at the same time, generating competing versions each missing the other's updates. The invention should also ensure that one appliance 14 does not accept an update to some data while an old version of that same data is returned by another appliance 14 to its clients. Thus, most simply, a token manager will allow, for a particular type of data at a given instant of time, either one appliance 14 to make updates to its cache of that data, or multiple appliances 14 to read its cache of that data.

The TKC 24 module is a simple cache of the tokens used by this cache appliance 14, obtained from the cluster's token servers 16. Tokens in this cache can be located by file handle, token client 24 ID, or token ID, and separate hash tables are used to provide efficient access using any of these keys. These tokens are stored non-persistently. To avoid creating a network-wide bottleneck at the token server 16, the file-handle space is divided among a set of independent token servers 16 using a static hash function that gives the identity of the system 10 running the token server 16 for that file handle (and many other file handles as well). The tokens obtained by the TKC 24 module fall into one of several types:

Attribute tokens, tagged by file handle. These come in sub-types for read, write, ownership, batch read and batch write.

Data tokens, tagged by file handle and byte range. These come in sub-types for read, write and ownership.

These tokens need not be stored persistently at the TKC 24, since all tokens are stored persistently at the TKS anyway, where they can be retrieved by the TKC 24 if necessary.

Tokens are labeled with an owning token client ID (CLID), a 128 bit Universally Unique Identifier (UUID) that typically indicates which cache appliance 14 obtained the token. Each token also has another 128 bit UUID that represents the specific token instance itself. Tokens function as distributed locks, and should only be granted if there are no incompatible tokens already outstanding. If a cache appliance 14 desires a new token that is incompatible with one or more outstanding tokens, the existing conflicting tokens should be revoked before the new token can be granted. Some tokens are associated with a "lease" (an expiration time). If the cache appliance 14 doesn't renew its lease based on its CLID, all tokens sharing that lease are released, and the client should subsequently obtain tokens using a new CLID. Other tokens are not associated with a lease, and are never released unless their owner releases them explicitly.

The compatibility rules for tokens are as follows:
tokens with the same CLID are always compatible
tokens applying to different file handles are always compatible
read attribute tokens are compatible with other read attribute tokens and ownership tokens, but not with write attribute tokens
write attribute tokens are not compatible with ownership, write or read attribute tokens
ownership attribute tokens are compatible with all tokens except for write attribute and other ownership attribute tokens
read data tokens are compatible with other read and ownership tokens, but not with write tokens, for the same file and an overlapping byte range
write data tokens are not compatible with ownership, read or other write tokens with overlapping byte ranges
ownership data tokens are compatible with all other data tokens except for write data tokens and other ownership data tokens, with an overlapping byte range Batch tokens do not change the entries in the table above, but add more entries; these are described more fully below.

All read data and read attribute tokens are leased, and are automatically revoked if the lease expires. Ownership and write tokens (including batch write tokens), on the other hand, should be explicitly returned, often after a revoke, before the token server 16 (TKS) can grant incompatible tokens to other token clients.

The CM 22 module is responsible for caching data and attributes at the cache appliance 14, storing a copy of this information in the cache file system 26 (CFS), communicating with the token servers 16 (TKSes) using the TKC 24 module to ensure that the cached data and attributes are the most recent available. In those cases where the latest copies of the data or attributes are stored at the back-end file server 12, the CM 22 uses the NC 20 module to communicate with the back-end file server 12 to read the data using the NFS protocol. In those cases where the latest copies of the data or attributes are stored in another cache appliance 14, the CM 22 module makes remote procedure calls to the cache-to-cache communications module (C2C) on the cache appliance 14 holding the data, to obtain the latest data or attributes.

The cache manager 22 module (CM) makes use of the tokens obtained from the token server 16 to synchronize its operation with cache manager 22 instances running in other cache appliances 14. The CM 22 caches files by dividing them into independently managed pieces—basically, file attributes, and file data for various non-overlapping byte ranges. Typically, an operation that reads attributes first obtains read attribute tokens, and an operation that reads a range of data first obtains read attribute tokens and a read data token covering the desired range. Similarly, an operation that modifies a file's attributes first obtains write attribute tokens, and an operation that modifies a range of data first obtains both write attribute and write data tokens for the corresponding file. For example, a CM 22 processing an NFS read operation obtains read attribute tokens for the file, and read data tokens for the range of the file being read. In one embodiment of the invention, file data is managed in fixed sized chunks, and read and write data tokens are obtained on entire chunks whenever any bytes in that range are read or written, respectively. Once the example read operation has obtained the requisite tokens, it can perform the operation locally, safe in the assurance that any operation on any cache appliance 14 that would affect any of the data being accessed by the read operation will be delayed until the read attribute and read data tokens can be revoked, which will not occur until the CM 22 has completed its read operation.

The CM's 22 operations, and how they work with the CFS 26, TKC 24 and NC 20 modules are now described. Note that these operations are slightly modified by optimizations based on ghost tokens and batch tokens, as described more fully below.

In many of these operations, cached file data and cached directory entries are tagged by a cached mtime value, indicating the mtime at the back-end file server 12 at the time the data or directory entry was retrieved from the back-end server 12. This value may be used in validating cache entries against the back-end file server 12 in those cases where synchronization tokens are not held continuously from the time the data is read from the back-end server 12 until the time the data is used by the cache appliance 14.

The operations of an individual cache manager 22 are now described:

The cm_getattr operation retrieves the attributes of a file, given its file handle. It first consults the TKC 24 module to see if the cache appliance 14 already has a read or write attribute token for this file handle, and consults the CFS 26 module to see if the file's attributes are present in the cache. If both conditions are true, the CM 22 simply returns the attributes from the CFS 26 file, and the operation is complete. Otherwise, if the TKC 24 doesn't have either a read or write attribute token, the CM 22 requests a read attribute token if necessary, which will cause TKC 24 to call the TKS to obtain at least a read attribute token (and any other token that can be granted without conflicting with an extant token for the same file). Once the TKC 24 has at least a read attribute token, and if there is no outstanding ownership attribute token for this file, then the CM 22 calls the NC 20 module to obtain the actual file attributes from the back-end file server 12, otherwise, when an ownership attribute token is present, the CM 22 calls C2C 28 module in the cache appliance 14 holding the ownership token. Once the attributes have been obtained, the CM 22 writes those attributes locally to the CFS 26 for future use.

The cm_read operation works very similarly to the cm_getattr operation, except that the CM 22 uses the TKC 24 to hold a read attribute token, as in cm_getattr, and a read data token on the chunk or chunks of the file affected by the read operation. If the tokens are present in the TKC 24 module, and the attributes and data are both present in the CFS 26 file, then the operation is performed locally without any involvement of the TKS or NC 20 modules. Otherwise, if the tokens are not present, the TKC 24 obtains from the TKS a read attribute token for the file, and one or more read data tokens for the chunks spanning the range of data read by the operation. Once the read attribute token is present, the CM 22 obtains current attributes from the back-end server 12, or from the cache appliance 14 having an owner attribute token. Once the attributes are present, the cache data file, if present, is checked for validity by comparing the cache file's datamod time field with the current modification time obtained from the back-end server 12. If the file's datamod time field matches the current attribute's modification time, then the data can be used directly from the cache. Otherwise, the CM 22 obtains the data from the back-end file server 12. If, after having obtained the desired tokens, valid data is not present in the cache, then if there are no outstanding ownership data tokens for this file, the CM 22 reads any missing data from the back-end file server 12 using the NC 20 module, otherwise, the CM 22 reads the data from the C2C 28 module in the cache appliance 14 holding the ownership token. The retrieved data, no matter what its source, is written to the corresponding attribute or data chunk CFS 26 file to handle future accesses. Note that as described above, data is considered present in the cache if the file's datamod time in the cache matches the file's modification time at the back-end file server 12, as checked while holding at least a read attribute token, or if a read or write data token has been held continuously since the data either was read from the back-end file server 12, or read from another cache appliance 14.

Changing the attributes of a file is done with the cm_setattr operation. The operation proceeds like cm_getattr, except that the token desired is a write attribute token instead of a read attribute token, giving the CM 22 the right to modify attributes in its cache. If the attributes and tokens are present in the cache, the cm_setattr operation simply updates the attributes in the cache and returns. If the desired tokens are not present in the cache, the CM 22 calls the TKC 24 to obtain a write attribute token (and a write data token if the call is changing the file length as well). Next, the attributes are retrieved from the back-end file server 12, if no cache appliance 14 holds an ownership token, or from the C2C 28 module on the owning appliance 14, if there is an outstanding ownership token. After the attributes are retrieved, they are written to the local CFS 26 file, and then updated as per the cm_setattr request. If the cm_setattr operation truncates the file, the cached data chunks are also truncated if necessary, and write data tokens are also obtained for the relevant range of the file. After the operation completes, the TKC 24 still holds a write attribute token (and possibly one or more write data tokens, for a cm_setattr call that changes the file length), and the attributes are still cached in the CFS 26 inode.

Data is written to a file using the cm_write operation. The operation begins by obtaining a write attribute token, and a set of write data tokens covering the set of chunks affected by the write operation. The cm_write operation then reads, by calling cm_read, any data chunks that will not be completely overwritten by the cm_write call. The cm_write operation then updates the CFS 26 files with the updated data, and updates the file's mtime, ctime and atime with the present time (or an explicit value passed into the cm_write call). If the desired write attribute and write data tokens are not present at the start of the operation, they are first obtained by calling the TKC 24 module to obtain the tokens from the TKS. An optimization is described further below for using batch write tokens to allow multiple writers to update the same file without transferring ownership of the write attributes token between cache appliances 14 on every write operation.

The cm_lookup operation determines, based on the incoming directory file handle, and desired file name, the file handle and attributes associated with the incoming file. The lookup operation does this by getting read attribute and read data tokens on the relevant directory, and then consulting its local Dynamic Name Lookup Cache (DNLC). The DNLC stores a set of entries mapping (directory file handle, directory datamod time, file name) tuples into target file handles. If an entry is found in the DNLC while the directory's read data tokens are held, or the directory's read attribute tokens are held, and the mtime of the directory matches the datamod of the DNLC entry, then the target file handle can be determined using the cache. If a usable entry is found, the cm_lookup operation next obtains the target file's attributes, which it does by calling cm_getattr on the target file handle to get those attributes. If the desired directory tokens are not present in the TKC 24 at the start of the operation, then the cm_lookup code asks the TKC 24 to obtain the tokens. Afterwards, it consults the DNLC to see if there is a DNLC entry with its datamod time matching the directory's current mtime (indicating that the cache data is still up-to-date). If the datamod time in the DLC entry matches the mtime in the directory's attributes, the cm_lookup operation can use the DNLC entry, otherwise, the CM 22 calls the back-end file server 12 via the NC 20 module to perform the lookup operation (while still holding the directory's read data and read attribute tokens). Once this NFS operation completes, a new DNLC entry is created holding the lookup results. Again, the operation would finish by calling cm_getattr. Also note that the DNLC consulted by the cm_lookup operation can also store a number of "negative" entries, said entries indicating that the file does not exist at the back-end file server 12.

There are a number of CM 22 operations, structured similarly to one another, that perform directory modifications. These operations are cm_remove for deleting a file, cm_link to create a hard link to an already existing file, cm_mkdir for creating a directory, cm_rmdir for removing a directory, cm_symlink for creating a symbolic link, and cm_rename for renaming a file or directory.

The cm_remove call works by first obtaining a write attribute and write data token on the directory containing the file or directory being deleted, and then performing a cm_lookup operation to determine the identity of the file or directory being deleted. This cm_lookup will operate from the cache if possible, but may have to contact the back-end file server 12 to get the file handle of the target object if the relevant DNLC entry is not present in the cache. After the identity of the target file has been determined, the CM 22 obtains a write attribute token on the target object, and then CM 22 sends an NFS unlink to remove the object. Note that the object may have a hard link count >1, in which case getting the write attribute token on the deleted file is necessary to ensure that all cache appliances 14 in the cluster see the new link count for the still extant file.

The cm_rmdir call works nearly identically, except that since directories do not have hard links to them, there is no concern about the state of the deleted directory after the rmdir operation completes. Thus, cm_rmdir can simply get write attribute and write data tokens on the parent directory (which will force the invalidation of DNLC entries on other cache appliances 14), and then perform the NFS rmdir operation to the back-end file server 12.

The cm_link call creates a new directory entry for an already existing file. It operates by getting a write attribute token and a write data token for the parent directory, and a write attribute token for the target file, since the target's link count will change. It then sends an NFS link call to the back-end file server 12, and updates the CFS 26 cache with the updated directory and file attributes received from the NFS call's return parameters.

A number of CM 22 calls create new files, directories or symbolic links (cm_create, cm_mkdir and cm_symlink). All of these operations work in virtually the same manner. Each begins by obtaining a write attribute and write data token on the parent directory. Next, each makes a call to the back-end file server 12 to actually create the target object. Once the operation completes, the calling operation has the file handle for the newly created object, as well as its attributes, and the updated directory's attributes. The DNLC can be updated, since the CM 22 has a write data token on the parent directory, and the directory's attribute cache can be updated in the CFS 26. The attributes returned for the new object can be used directly, since no other client will have been able to access the newly created object while the parent directory's write data token is held by the cache appliance 14 creating the new object.

The cm_rename operation is the most complex operation, as it combines the most complex elements of the cm_link and cm_remove operations. Most generally, a cm_rename operation affects four objects, a source and target object, and the source and parent directories containing those objects. The cm_rename operation deletes the target of the rename operation, if it already exists. Furthermore, if that target exists, is not a directory, and has hard links to it, the CM updates the target's attributes to include its updated link count. Finally, if the object renamed is a directory, and the source and target directories differ, the ". ." pointer within the renamed directory is updated.

Thus, a cm_rename operation begins by obtaining write data and write attribute tokens for both the source and target directories, and then looking up (via cm_lookup) both the source and target objects; note that the cm_lookup operation also gets at least read attribute tokens on the source and target objects as well. The CM 22 then concurrently performs the rename operation at the back-end file server 12. The specific tokens desired on the source and target objects depend upon the type of the objects affected by the NFS rename operation is sent to the back-end. If the source object is a file, no additional tokens are needed on it, and if the target object is a directory, or a file with link count 1, the CM 22 also does not need additional tokens on the target. If the target object is a file with a link count >1, then the CM 22 uses a write attributes token on the target, since the link count will be decremented.

And if the source object is a directory and the source and target directories differ, then the CM 22 uses a write attribute and write data token on the source object, since its ". ." name entry will be updated by the cm_rename operation, changing both its contents and its mtime.

The cm_readdir operation reads the contents of a directory, returning a set of directory entries, each of which contains a file name, a file ID, and an opaque pointer to the next entry, which, if passed in a new cm_readdir call, will continue the enumeration at the next entry in the directory. The contents of a readdir entry are described in more detail in the IETF's RFC 1813 describing NFS version 3. The cm_readdir call begins by calling the TKC 24 module to get read attribute and read data tokens on the target directory. The cm_readdir code maintains a contiguous set of directory entries in a CFS 26 cache file, along with the cookie value used to read the first entry stored in the CFS 26 file, and the cookie value stored in the last entry in the CFS 26 file.

The cm_readdir call then works as follows. Upon receiving a readdir call, first it is desired to ensure that there is a read attribute and read data token for the directory. Then, given an incoming cm_readdir call with a specified readdir cookie, it is checked to see if the incoming cookie matches the CFS 26 file's base cookie value (which will usually be 0, for a directory enumeration cached in its entirety). If it does match, cm_readdir can start returning entries directly from the start of the CFS 26 cache file, continuing for as many entries as the caller requested. Similarly, if incoming readdir call's cookie value matches the cookie value of the last entry in the CFS 26 file, then if the EOF flag is set, the operation completes locally by also returning EOF to the cm_readdir's caller. If the EOF flag is not set, the cm_readdir code continues reading the directory at the end of the CFS 26 file, using the cookie value of the last entry in the CFS 26 file. If neither of these tests match the incoming cookie value, the cm_readdir code discards the contents of the CFS 26 cache file, and starts reading the directory at the specified cookie offset, filling the data from the back-end file server 12. An alternative implementation could search the cached directory entries for the specified cookie offset before going to the back-end server 12, retrieving the data from the cache if the cookie is located anywhere within the CFS 26 cache file.

Figure 3:
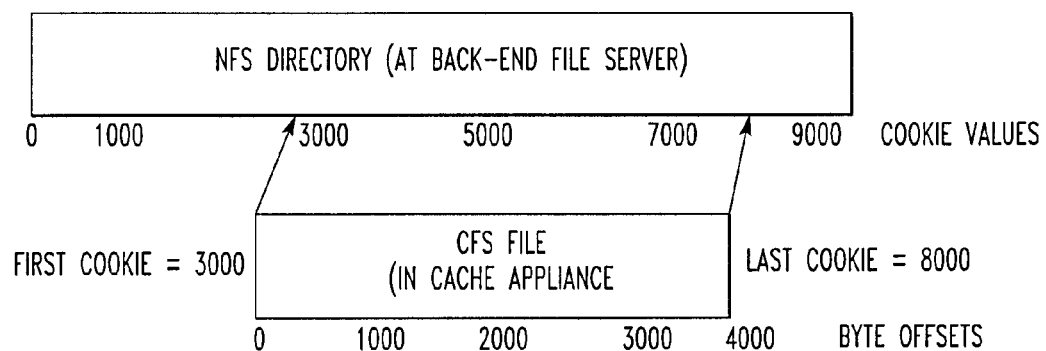
FIG. 3 illustrates the relationship between a first cookie, a last cookie and a cache FS file contents.

FIG. 3 illustrates the relationship between the first cookie, last cookie and the CFS 26 file contents. The back-end file server 12 stores a directory addressed by opaque (to the cache appliance 14) cookie values, illustrated as 0, 1000, 3000, 5000, 7000, and 9000. The CFS 26 file stores the segment of directory entries retrieved by doing NFS readdir operations to the back-end server 12 starting at the server's cookie value of 3000, up to a cookie value of 8000. Note that when any NFS clients 20 send cm_readdir operations that desire reading past the end of the CFS 26 file at offset 4000, then the cm_readdir call will continue filling the CFS 26 file by calling the NC 20 to make an NFS readdir call with an NFS server cookie of 8000 (from the "last cookie" field in FIG. 3).

The C2C 28 interface provides a mechanism for one cache appliance 14 to access data and attributes stored in another cache appliance 14. It consists of simplified versions of NFS read, NFS write, NFS getattr and NFS setattr, with the simplification that when a C2C 28 operation calls into special versions of cm_getattr, cm_setattr, cm_read and cm_write that do not call into the TKC 24 module to obtain tokens, but instead just read or write the appropriate information in the appropriate CFS 26 files. The appropriate tokens effectively have already been obtained by the cache appliance 14 calling the C2C 28 functions.

There are no C2C 28 operations required for directory manipulating operations, since those operations are always performed to the back-end file server 12.

After a node fails and restarts, the restarted cache appliance's TKC 24 module will locate its TKCID in its persistent storage, but the TKC 24 will not know what tokens are owned by that TKCID, since the token state itself is stored persistently at the TKS. The CM 22 node then searches the local cache for modified data, which is to be protected by a write attribute and/or write data token; this is done simply by searching the cache file system 26 (CFS) for modified files (recall, indicated via the 1 bit in the Unix mode bits). The CM 22 then requests that the TKC 24 reclaim the tokens held for those files, which the TKS can do by simply searching its database for tokens owned by the TKCID for the specified files. The TKS will then return the token IDs to the TKC 24, possibly through multiple RPCs between the TKC 24 and the TKS. This process will be repeated in the background for all dirty data found in the cache appliance's 14 cache.

When a token server 16 fails, it simply restarts, and reloads the set of persistent tokens (typically write tokens) from its persistent storage. At the same time, all existing leases are canceled, so that the lease-based tokens (typically, read tokens) are all discarded by the token client 24 modules in the cache appliances 14.

Many storage systems provide a high availability operating mode where the loss of any single node can be weathered without any significant service outage. The following describes how this invention handles the loss of a cache appliance 14 and/or a token server 16, when configured for high availability (or HA) operation.

When a cache appliance 14 is configured in HA mode, it passes an ordered stream of data updates to a designated secondary system, which stores those updates in case the secondary system is to take over for the failed appliance 14. Each update consists of an opcode, in this case specifying a write operation, a file handle, a 64 bit byte offset, and a 32 bit byte count, followed by "count" bytes representing the modified data. These entries are written to a dedicated CFS 26 file system at the secondary appliance 14—this update should occur before the primary appliance 14 can respond to the client system. Note that an appliance 14 may be functioning as a primary caching appliance 14 performing incoming file system 10 operations, and simultaneously as a secondary appliance 14 for another caching appliance 14.

Figure 4:
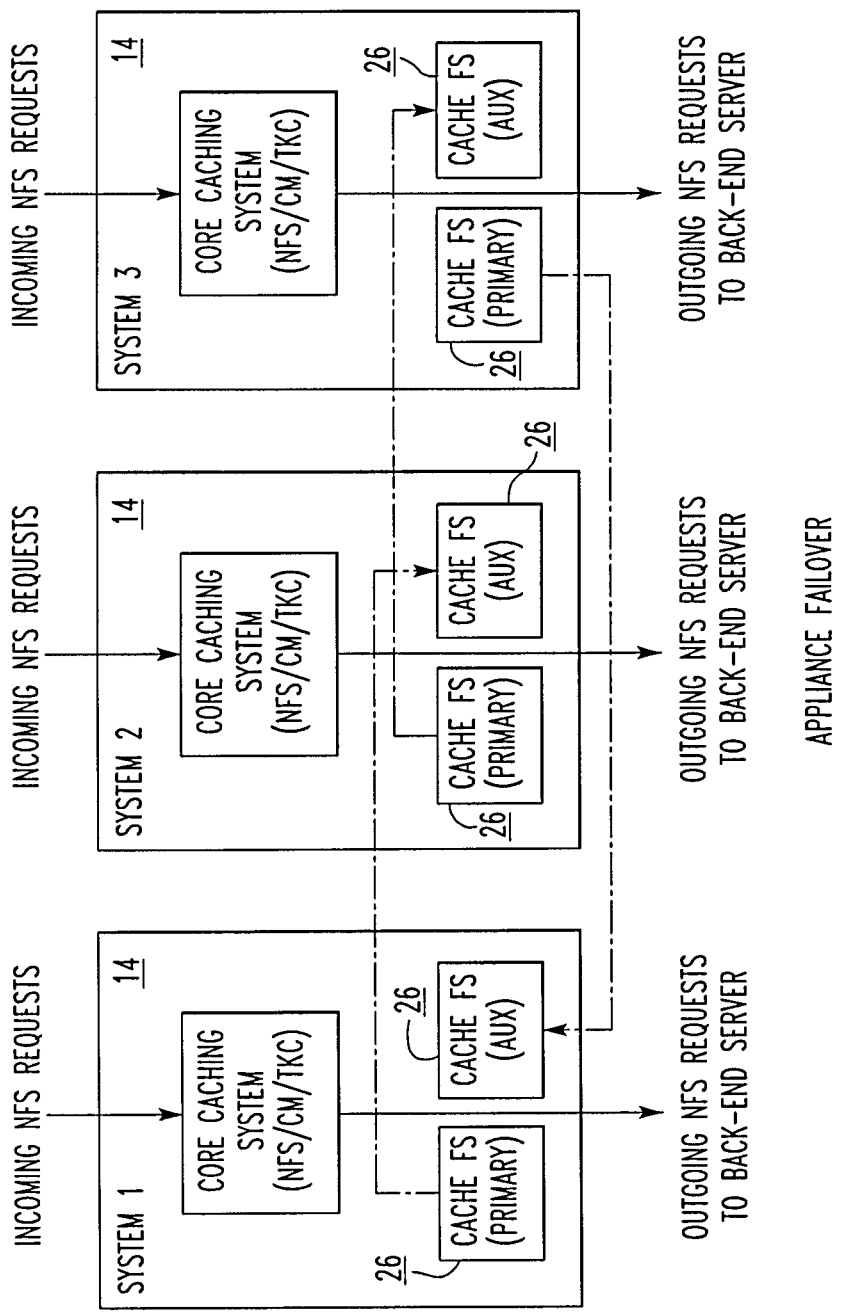
FIG. 4 is a block diagram regarding cache appliance failover.

FIG. 4 shows the data flow in appliance 14 failover. The appliances 14 are comprised of the same components as illustrated in FIG. 2, except that there are now two CFS 26 instances in each appliance 14, one holding the data cached by the system 10 (labeled "primary") and one holding a copy of the modified data from its failover partner (labeled "aux"). The dashed arrows show the flow of updated data from the primary CFS 26 instance to its auxiliary CFS 26 instance.

Aside from propagating updates from the primary node to the secondary, the primary node also is to send an indication to the secondary when dirty data has been cleaned (written back to the back-end file server 12). This information is passed to the secondary by passing a "clean" opcode, a file handle, a 64 bit offset and a 64 bit count, indicating that all bytes in the specified range are now clean, and can be discarded from the secondary if necessary. The clean operation may be passed from the primary to the secondary any time after the data is actually cleaned, but the clean operation should be sent before the data in the same range is updated by the primary again.

When an HA primary/secondary relationship is established, the primary appliance 14 sends the secondary appliance 14 its TKCID. Once a primary failure occurs, the secondary appliance 14 communicates with the TKS that the secondary is taking over responsibility for the failed node's TKCID. The secondary node then locates its copy of the primary node's dirty data, and requests new tokens, owned by the secondary node's own TKCID, to replace the tokens owned by the failed primary system's TKCID. Until this process completes, the secondary may also see token revokes for tokens owned by the primary's original TKCID. The processing of a revoke received for tokens owned by the primary's original TKCID works the same as normal token revoke processing—any covered data is stored back to the back-end file server 12. New tokens obtained by the secondary for the primary system's data are obtained using its own TKCID, not the primary's original TKCID. Note that the secondary can continue to use the primary's TKCID to protect data received from the primary for as long as it wants, and gets a new TKCID for new write operations.

When a cache appliance 14 restarts, it locates the dirty data and attributes in its cache, as described above, and tries to regain the tokens it had with its original TKCID and covering the data or attributes in question; this original TKCID is stored in stable storage on both the primary and secondary nodes for this purpose. The tokens will still be available if no secondary has taken over for this node; otherwise, the tokens with the original node's TKCID will have been revoked when the secondary took over for the primary. In the case where the secondary node took over for the primary, the recovering primary's attempts to reclaim those tokens will fail, causing the recovering primary to invalidate that portion of its cache holding the dirty data and attributes. In effect, the TKS acts as the definitive authority during a failover, indicating which cache appliance 14 has ownership of modified data in any cache appliance 14.

Figure 5:
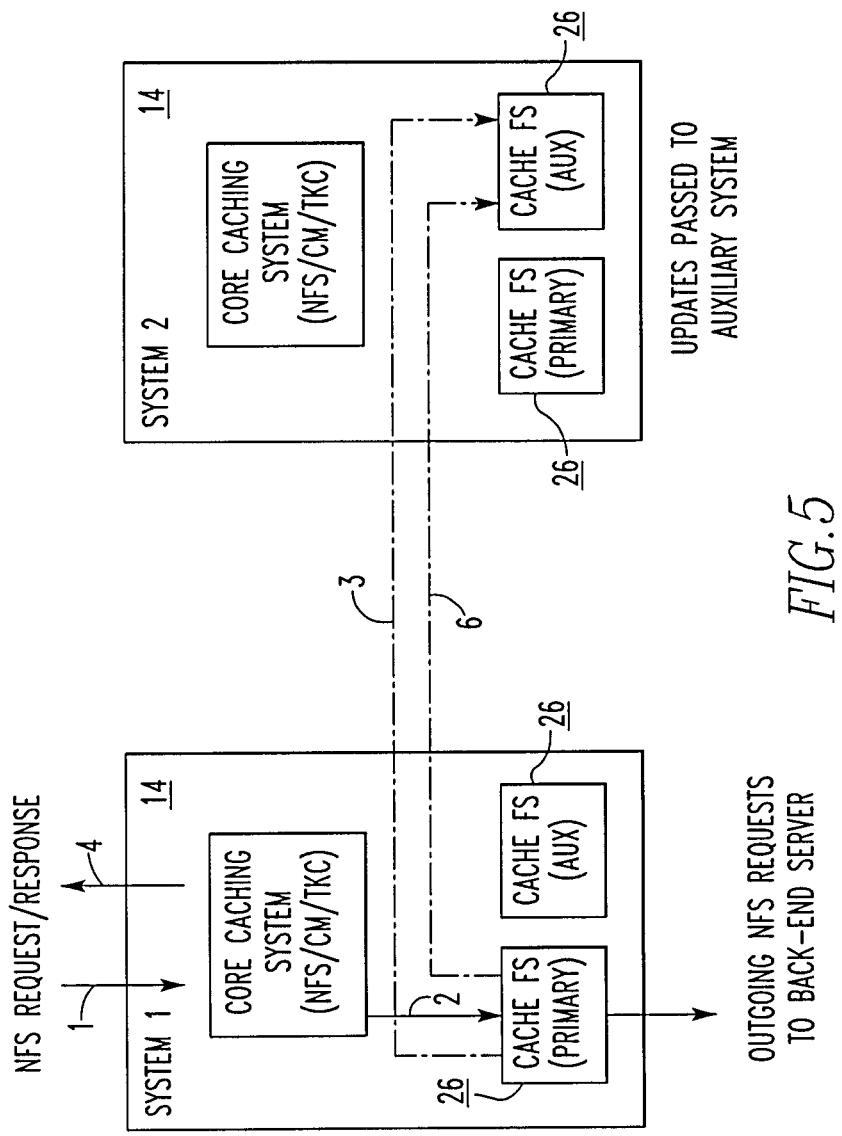
FIG. 5 is a block diagram regarding high-availability message flow.

FIG. 5 shows the message flow within a cache appliance 14, and between a cache appliance 14 and its failover partner, when handling a user data write operation. In step 1, the system 10 receives an NFS write operation from the network, which is translated into a cm_write call to the cache manager 22. Next, in step 2, cm_write function calls the CFS 26 module's write function, which does two things: it copies the data into its own non-volatile disk buffers, and it transfers the data to the CFS 26 module on the secondary system (step 3). Now that the data is persistently stored on two separate systems, the cm_write call completes, allowing a response for the original NFS write to be sent to the NFS client 20 (step 4). At some later point, in step 5, the cache manager 22 stores the modified data back to the back-end file server 12, and notifies the secondary system (step 6) that it may discard the copy of the modified data in its own cache file system 26 (since the data is now stored safely at the back-end server 12).

The token server 16 is the final arbiter of which cache appliance 14s are allowed to read or write which parts of cached files. In the case of a TKS failure, a spare TKS should continue operation with a reconstructed token database. This database should include every persistent token granted to any client, but may include a number of revoked or returned tokens, since those extraneous tokens are harmless and will be revoked on a conflict, anyway.

These constraints are satisfied by having a secondary TKS acting as a hot spare for each primary TKS operating in HA mode. The primary TKS generates a persistent log file consisting of a set of entries <token ID, token client ID, token type, file handle, byte start, byte count>, where the token ID gives the unique token UUID associated with a particular token instance, the token client ID identifies the CM 22 instance obtaining the token, token type describes whether this is a read attribute, write attribute, read data or write data token (among others), file handle gives the file handle to which this token's guarantees apply, and the byte start and byte count give, for data tokens, the range of bytes covered by the token.

To provide persistence, the token server 16 maintains two files of actively granted tokens. As the token server 16 grants tokens, it logs the state of each token, in the form described above, to the first log file. As more space gets added to this first log file, the TKS simultaneously reads the same amount of data from the second log file, which also contains a log of older token grants. For each token read from the second log file, the TKS checks its database to see if the token is still outstanding. If it isn't, then the token entry from the second log file is simply discarded. Otherwise, the token is appended to the end of the first log file. Once the second log file is empty, the token server 16 switches the identities of the two log files and continues, now appending to the empty log file and discarding obsolete entries from the full log file. If the token server 16 bounds the number of outstanding tokens to a fixed number, then this log organization guarantees that there are log files that are both bounded in size and contain the set of all currently granted tokens.

When operating in HA mode, the primary TKS simply makes sure that it passes all updates to the token log files to the secondary, which maintains its own copies of the log files to track the tokens persistently. Then, after taking over for a failed primary, the secondary TKS simply performs the processing that a primary TKS would after a failure—it reloads the token state from the log files, creating an in-memory version of the token database.

Note that this description is in terms of a single token server 16, but it should be clear that a system 10 can contain multiple token servers 16, since tokens associated with different file handles have no interactions. Thus, the system 10 can use a hash of a token's associated file handle, for example, to determine which token server 16 instance is actually managing the tokens for that file handle, and thus distribute token management processing to an arbitrary number of token servers 16 (TKSes).

An example is now provided with two cache appliances 14, A and B, accelerating the performance of back-end file server S. The example of creating a new file is first described, New, and filling that file with some new data via cache appliance 14 A, and then writing an already existing file Exist via this same cache appliance 14 A. Next, a user connected to cache appliance 14 B opens Exist and reads all of its data via cache appliance 14 B.

First, a client sends an NFS create for New to cache appliance 14 A. This triggers a cm_create operation, which gets a write attribute and a write data token on the directory containing New, invalidating any cached information about the parent directory on all other cache appliances 14. The cm_create operation then calls the NC 20 module to send an NFS create to back-end server S. Upon receipt of the response, the cache appliance 14 updates its DNLC, the CFS 26 file attribute cache for the newly created file, and the CFS 26 file attribute cache for the updated directory itself.

Next, cache appliance 14 A writes multiple blocks to New. The first write operation begins by requesting a write data token for the chunk being updated, but the token server 16 will try to extend that token to the entire file if that is possible without generating any additional token revokes. Once the file's write attribute and write data tokens have been obtained by cache appliance 14 A, the write operation can continue, updating the data in the CFS 26 file corresponding to New and marking it as containing dirty data that should to be written back to S. The second and later writes all arrive at the cache appliance 14 after it has obtained all of its desired tokens for New. Thus, these later write operations simply update the existing cache file, marking the new blocks as dirty and updating appropriate file attributes locally for each write, protected by the appliance's write attribute token for New. Note that as long as cache appliance 14 A holds a write data token on New, it does not need to write the data back to the back-end file server 12.

Continuing with this example, cache appliance 14 A now opens file Exist by calling cm_lookup. The cm_lookup operation gets a read data token on Exist's parent directory, and then consults the DNLC to see if Exist is present in the cache. If the DNLC entry exists along with a read attribute token for Exist, the CM 22 performs a cm_getattr operation to get the current attributes for Exist, and the open operation is essentially complete. If the entry does not exist in the DNLC, the cache manager 22 calls the NC 20 module to send an NFS lookup for Exist to the back-end file server 12. Once this call completes, the appliance 14 has the file handle corresponding to Exist, and performs a cm_getattr operation to obtain Exist's current attributes, and complete the open operation.

The application then sends a number of cm_write operations to the appliance 14. The first cm_write operation obtains write data tokens for the target file, and in the absence of any other users accessing the file, the write data token's range will be the entire file. Once this token has been obtained, the cm_write operation can simply copy the incoming data from the write operation request into the CFS 26 file tagged with the NFS file handle, and ensure that the file's length is updated to include the last byte written, if the write extends the file length. The succeeding write operations will function in the same way, except that they will find the write data token already in the token client 24 (TKC) module.

Note that the CM 22 is not required at this point to write the updated CFS 26 file back to the file server S.

Next, in the example, another cache appliance, B, has a client that reads Exist. The appliance 14 begins with a cm_lookup operation that will do a cm_getattr call to get the file's current attributes. These attributes are still stored at appliance 14 A, protected by a write attribute token. Thus, in order to grant a read attribute token to B, the token server 16 will revoke the conflicting write attribute token from A. At this point, A will do one of two things—it will either store the updated attributes back to the back-end file server S, or it will contact the TKS and request an owner attribute token for the file. In the first case, the write token is returned after writing the attributes to the back-end server 12, and appliance 14 B goes directly to the file server back-end to get the attributes for Exist. In the second case, A gives up its write token, which prevents it from making further modifications to Exist's attributes, but by getting an owner attribute token, it now effectively advertises itself as owning the definitive copy of the information (in this case, Exist's attributes). In this second case, appliance 14 B sends a c2c_getattr to appliance 14 A to get a copy of the file's attributes, and the attributes do not have to be sent to the back-end file server 12 at all, reducing the load on the back-end file server 12.

Finally, after appliance 14 B opens the file, it then reads the data written earlier by appliance 14 A. Appliance 14 B reads the first block by doing a cm_read, which attempts to get a read data token on the first chunk of data in Exist. The TKS will attempt to revoke the write data token from appliance 14 A, offering appliance 14 A a new data write token with a byte range reduced to avoid conflicts. At this time, appliance 14 A will have several options. It may give up its entire data write token, and store all of the data back to file server S. It may accept the smaller write token, and store the data covered by the now revoked range back to file server S. And finally, it may take one of the preceding actions, but instead of sending the data back to file server S, it may keep the data locally and simply get an owner data token for the revoked range. In the first two cases, appliance 14 B will read its data from the back-end file server 12, while in the last two cases, where ownership tokens are obtained for the updated data, appliance 14 B reads the data from appliance 14 A, using a c2c_read operation.

Under normal operation of this invention, NFS read and write operations to the same file use read attribute and write attribute tokens respectively. Certain workloads, however, generate a large number of read and write operations to the same file, and every time that a write attribute token is requested, all of the other attribute tokens should to be revoked, simply to update the subset of file attributes modified by write operations, specifically the modification time (mtime), change time (ctime), and file length. The result of this approach is that every write operation is fully serialized with respect to every other read or write operation on the file, whether or not any of the same data bytes are affected, leading to a significant loss of potential concurrency.

In the case of significant write sharing within a single file, it would be preferable to return responses to the cm_read or cm_write calls serialized as if a group of operations had all been executed together, to minimize the effort spent revoking and re-obtaining attribute tokens for the data file.

To accomplish this, two additional types of attribute tokens are defined, batch read attribute and batch write attribute tokens, giving the following updated compatibility rules:
  Read attribute—compatible with owner attribute, read attribute and batch read attribute.
  Write attribute—not compatible with any other attribute token.
  Batch read attribute—compatible with read attribute, owner attribute, batch read attribute, and batch write tokens attribute.
  Batch write attribute—compatible with owner attribute, batch read attribute and batch write attribute tokens.
  Owner attribute—compatible with read attribute, batch read attribute, and batch write attribute tokens.

The behavior of cm_read as described above is modified to obtain a batch read attribute token instead of a normal read attribute token. While holding a batch read attribute token, the cache manager 22 obtains the file attributes from the back-end file server 12 to complete a read request. The cache manager 22 can obtain these attributes in the same way as described above, but because write attribute tokens may be outstanding simultaneously, these attributes may be out of date. The cache manager 22 thus bounds how long it will cache attributes under a batch read attribute token (illustratively to perhaps 100 milliseconds) so the returned attributes will not be significantly out of date, but so that the back-end file server 12 will not have to be frequently consulted, either.

The behavior of cm_write as described above is modified to obtain a batch write token if the write operation does not extend the file's length. While holding a batch write token, the cache controller makes an NFS setattr call to the back-end file server 12, adjusting its mtime by a few hundred nanoseconds to obtain a range of mtime values, each separated by a single nanonsecond, that this cache manager 22 alone can hand out with cm_write responses during the next short interval (illustratively perhaps 100 ms). This allows the cache manager 22 to hand out unique mtime values for many write operations performed in the near term future, while making a single call to obtain a batch write attribute token, and a single call to the back-end file server 12 to get a range of mtime values to return with those write operations.

Note that even when using batch tokens, cm_read and cm_write still obtain data read and data write tokens as described previously.

The benefit of using batch tokens is that multiple cache appliances 14 can perform read and write operations to non-overlapping parts of a single file (with each cache appliance 14 having a separate data write token synchronizing access to its own modified data), without needing to communicate with the TKS on every operation to get an updated read or write attribute token. By using a batch write attribute token instead, many read and write operations can run without communicating with the TKS at all.

The downside to using batch tokens is that since every cm_read or cm_write operation returns an old mtime value in its returned file attributes (since the mtimes associated with batch tokens are always older than the current file's mtime), the data read from or written to client caches when using batch tokens always appears to be stale to the NFS clients 20, and will be discarded by the NFS client 20 on the next file open. In practice, this tradeoff yields significant performance gains for applications involving heavy read/write data sharing, because the NFS client 20 caches are almost always invalid in environments involving heavy write sharing anyway.

Note that since data can't be cached as effectively when cm_read and cm_write use batch tokens, the TKS normally upgrades batch read attribute tokens to normal read tokens, and upgrades batch write attribute tokens to normal write attribute tokens, when the target file does not appear to be write shared. Write sharing can be heuristically determined by the token server 16 (TKS) by observing a relatively high number of write attribute token requests that trigger other token revokes. For example, illustratively, the TKS might be configured to upgrade batch tokens to normal attribute tokens when the fraction of batch write tokens issued for a given file drops below 2% of the number of the total attribute token obtain calls received over a period of 10 seconds.

In the discussion above, when the CM 22 is to cache attributes or data from the back-end file server 12, it first obtains at least a read token from the TKS, and then obtains the actual attributes or data from the back-end server 12. The optimization described here allows this invention to perform cm_lookup and cm_getattr operations more efficiently when a cache miss occurs by performing TKC 24 calls and back-end NFS calls operations concurrently.

Recall that when the CM 22 receives a cm_getattr call, it consults the CFS 26 to see if the file attributes are present, and checks with the TKC 24 to see if there are cached read attribute tokens for the file handle. If both tests pass, the CM 22 completes the request immediately, without contacting either the TKS or the back-end file server 12. However, if the read attribute token is missing, the CM 22 should first obtain the token, and then, after the CM 22 has a guarantee that no further updates to the file's attributes are possible, does the CM 22 call the back-end file server 12.

The CM 22 should contact both the TKS and the back-end server 12 for this operation, but the operation would have a significantly smaller latency if the two calls could be made concurrently. However, attributes obtained before holding a read attribute or write attribute token may be incorrect if the attributes are actually obtained before the attribute token, and an update is made by another cache appliance 14 in the interval between obtaining the file attributes and the corresponding attribute token.

Figure 6:
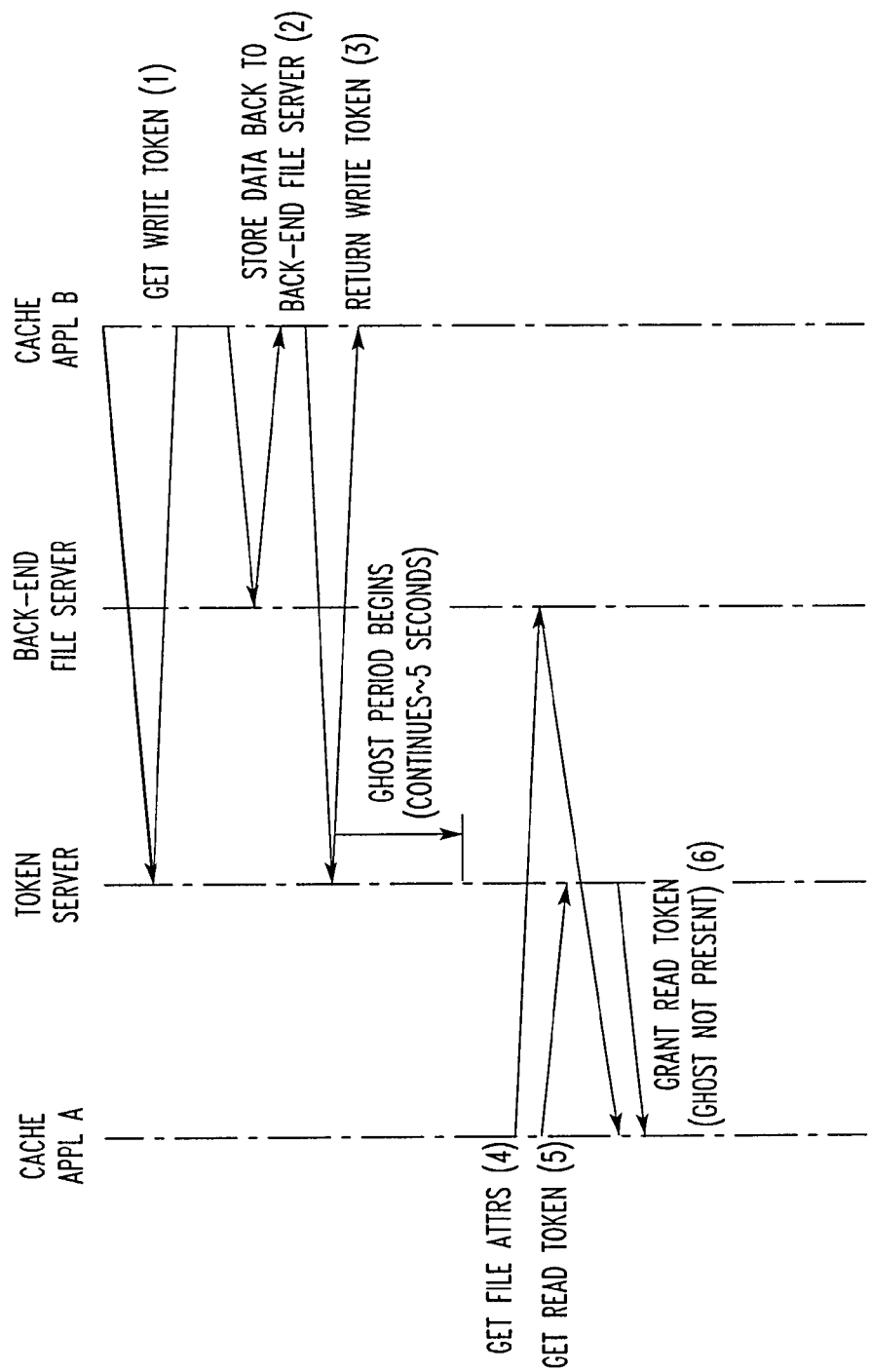
FIG. 6 is a representation regarding ghost tokens.

This race condition can be eliminated by having the TKS keep track of a write token for a short period (called the "ghost" period, typically a few seconds) after the token has been revoked or returned, storing specifically the time the token was last valid. Then, when returning a new token from the TKS to a token client 24, the TKS returns the minimum number of milliseconds ago that any write token was last held on this file, a value called the write token age. If the write token age is less than the ghost period, the TKS will actually have information in its token database giving this value. If the time is longer than the ghost period, the TKS is free to have discarded its data describing this file handle, but it still can safely return the ghost period as a lower bound on the write token age. The cache appliance 14 makes use of the token age as follows: the cache appliance 14 handles a cm_getattr cache miss by sending the TKC 24 call to get a read attribute token in parallel with the NFS getattr to the back-end file server 12. When the TKC 24 call completes, the CM 22 examines the write token age, and if the completion time of the NFS getattr call, minus the write token age, is less than the time at which the CM 22 first sent the NFS getattr call, then the CM 22 can safely use the results of the NFS getattr executed concurrently with the TKS getTokens call, because the CM 22 knows that there were no updates to the file's attributes since before the start of the NFS getattr call. FIG. 6 shows the messages involved in this scenario.

In FIG. 6, the standard case is shown where a file was updated a relatively long time in the past by cache appliance 14 B, followed by a new access to the file from cache appliance 14 A. In this case, at step 1, cache appliance 14 B gets a write token, modifies the file attributes locally, and then, at a later time in step 2 stores the updated attributes back to the back-end file server 12, and then returns in step 3 the write tokens to the TKS. Once the last write token has been returned for the file, the ghost token period commences for a fixed period (illustratively here 5 seconds), during which time the TKS preserves state indicating the last time at which a write token was held by any token client 24 for this file. At step 4, some time after the ghost period expires, cache appliance 14 A, as part of handling an incoming cm_getattr call, sends two concurrent requests, one to the TKS to get a read attribute token on this file, and one to the back-end NFS server to get the file attributes. Because the call to the TKS arrives after the expiration of the ghost period, the TKS's response to cache appliance 14 A returns a write token age of 5 seconds (the ghost token period). Cache appliance 14 A then verifies that the time between the NFS getattr call was issued in step 4 and the time that the getToken response was received was less than the write token age. In this example, this condition is verified, so cache appliance 14 A knows that there were no write tokens outstanding any time in the period between the time that the back-end NFS getattr was executed, and the time that the read attribute token was actually granted, and thus, that cache appliance 14 A can use the results from the NFS getattr as if it had a read attribute token from the start of the NFS getattr call.

Figure 7:
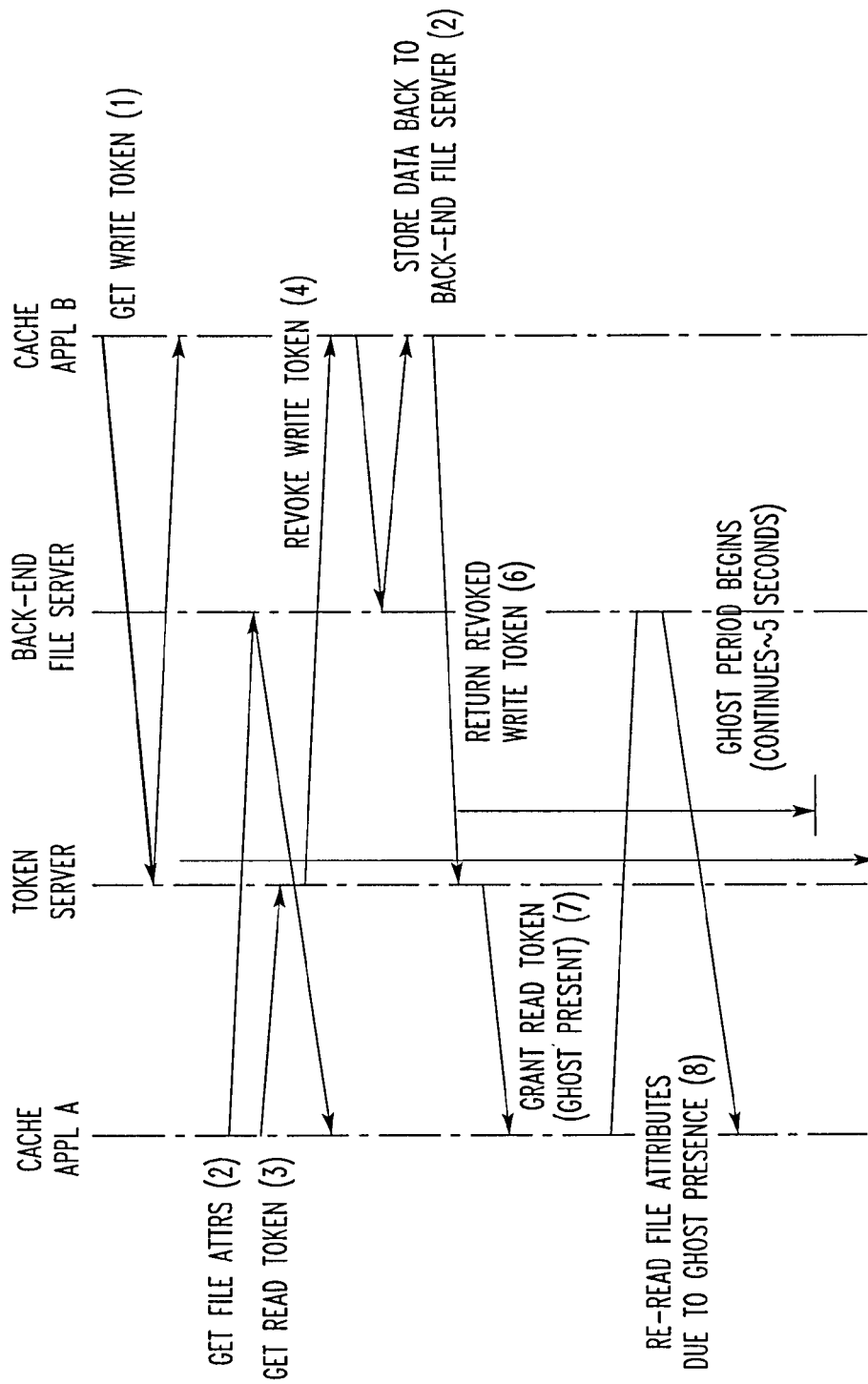
FIG. 7 is a representation regarding an exceptional case concerning ghost tokens.

In FIG. 7, the message flow in the relatively rare case where that race condition is lost, and the first cache appliance 14 has to retry its NFS getattr call is considered.

FIG. 7 shows a cm_getattr call on cache appliance 14 A running shortly after an update is made to the same file's attributes by cache appliance 14 B. This is the rarely occurring exceptional case for ghost token processing, where cache appliance 14 A will to retry its NFS getattr call to the back-end file server 12 in order to get the correct file attributes. In step 1, cache appliance 14 B gets a write token from the TKS and then modifies the file's attributes locally. In steps 2 and 3, cache appliance 14 A, as part of handling a cm_getattr call for the same file, optimistically concurrently sends a getToken call to the TKS, while sending an NFS getattr to the back-end file server 12. The getToken call triggers a revoke of cache appliance 14 B's write attribute token (step 4), which is immediately followed by the storing back of the modified attributes to the back-end file server 12 (step 5). The write token is then returned to the TKS (step 6), which grants a read attribute token to cache appliance 14 A (step 7). Because the ghost period did not yet expire for the revoked write token, the TKS still stored the exact write token age, at the time that, in step 7, it received cache appliance 14 A's getToken call. Thus the TKS returns a write token age of 0 milliseconds along with the read attribute token returned to cache appliance 14 A. Because this 0 ms period is shorter than the time between the start of the NFS getattr call and the time that the TKS getToken call completed, cache appliance 14 A knows that the NFS getattr call it executed may have executed while cache appliance 14 B still held a write token, and thus, may have returned incorrect attributes. Thus, in step 8, cache appliance 14 A retries its NFS getattr call to the back-end file server 12, this time while holding the read attribute token obtained in step 7, which ensures that the attributes can be safely used.

The same approach can be used for cm_lookup calls. If there is a DNLC cache miss on the name lookup performed locally by the CM 22 when doing a cm_lookup operation, then the CM 22 will perform an NFS lookup operation to the back-end. This operation will return both the NFS file handle for the target file as well as the attributes for the target file. Although the NFS lookup operation returned the target file's attributes, it does so before the CM 22 has read attribute tokens on the file, and before the CM 22 could even request tokens for the file, since until the lookup operation completes, the CM 22 does not even know the file handle for which it desires tokens. Thus, naively, the CM 22 would have to sequentially perform the NFS lookup operation to determine the target file handle, followed by a token manager getToken operation to get read attribute tokens for the target file, followed finally by an NFS getattr operation for the target file, most likely returning the same attributes as were returned originally by the NFS lookup operation.

However, with the ghost period mechanism, the CM 22 can send an NFS lookup operation, and once that operation has completed, the CM 22 can obtain the read attribute tokens from the TKC 24. If the completion time for the call to the TKC 24 to obtain a read attribute token, minus the write token age, is less than the time the initial NFS lookup operation was sent, then the CM 22 knows that no modifications were made to the target file's attributes since before the NFS lookup call executed, and thus the CM 22 can use the file attributes returned by the NFS lookup call, even though no tokens were held by the client at that time those attributes were returned.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

Abbreviations
AFS—Andrew File System. A precursor to NFS built by a joint venture of Carnegie Mellon University and IBM in the mid-1980s, it included a great deal of support for caching file attributes and data at file system clients.

AFS/NFS Translator—a protocol translating server that acted as an NFS server and AFS client, allowing NFS users to access data stored on AFS file servers.

Back-end file server—In this invention, the server storing the data that is cached by this invention.

C2C—Cache-to-cache communications module. In this invention, a module that implements a simple interface allowing one cache appliance to read and write data and attributes to another cache appliance.

CFS—Cache File System. In this invention, a simple file system providing a flat name space tagging files by a simple string, typically representing a file handle received from an external file system protocol request.

CIFS—Common Internet File System. In reality, a family of protocols used by Windows PCs to access storage on a file server; this is the former SMB, or Server Message Block, protocol, given an updated name.

CLID—CLient ID. A UUID identifying a particular cache appliance to the token server.

CM—Cache manager. In this invention, the module that receives file system operations from the protocol modules, and executes them by either reading or writing data in the cache, and/or performing operations to the back-end file server.

DFS—Distributed File System. A successor to AFS offered by IBM Transarc Labs and the Open Software Foundation.

DNLC—Dynamic Name Lookup Cache. A cache of directory contents. Instead of simple file contents, entries in the DNLC quickly map a directory file handle combined with a file name into the file handle of the file having that name in that directory.

EOF—End of file. An indication that an agent reading sequentially through a file has reached the file's end.

FFS—The Berkeley Fast File System. An early version of the Unix file system, implemented at the University of California at Berkeley.

FreeBSD—An freely licensed version of the Berkeley Standard Distribution Unix operating system.

IETF—Internet Engineering Task Force. The group that maintains specifications for those protocols used on the Internet. The specifications are available at ietf.org.

HA—High Availability. Typically, indicates a configuration of a multi-node server system with sufficient redundancy that at least any single node can fail without any loss of data, or loss of access to data, by any client.

NAS—Network Attached Storage; typically data storage accessed via the NFS or CIFS protocols over a network.

NC—NFS Client.

NFS—Network File System. A family of protocols used to access files on a server from one or more clients on a connecting network. NFS version 3 is the most commonly implemented version, and is described by the Internet Engineering Task Force (IETF) in RFC 1813, which can be obtained at ietf.org.

NS—NFS Server.

OpenSolaris—An partially open sourced version of Sun Microsystems' Solaris operating system, providing state of the art implementations of some interfaces and protocols, including NFS servers and clients, and the vnode file system interface.

RPC—Remote Procedure Call. A protocol, upon variants of which NFS and AFS are both based, that provides a simple "call and response" model for handling requests from a client to a server. A client makes a call, and gets a response message when the results of the call are ready.

TKC—Token Client. The module that obtains synchronization tokens from the token server, and keeps track of which tokens are currently already held.

TKCID—A UUID naming a specific token client instance.

TKS—Token Server (or Token Manager). The module that grants synchronization tokens to TKC modules within the cache appliance cluster upon demand. The TKS ensures that no two conflicting tokens are outstanding simultaneously by revoking outstanding tokens upon receipt of a request for a conflicting token.

UFS—Unix File System. A straightforward file system implementation present in most Unix operating systems, and typically accessed via the VNODE interface.

UUID—Universal Unique IDentifier. A 128 bit value guaranteed to be unique across all machines and all times.

VNODE interface—An internal interface within an operating system kernel to allow a network protocol such as NFS or AFS to access a file system within that operating system without specific knowledge of exactly which file system is being accessed.

The invention claimed is:

1. A system for responding to a file system protocol request in regard to a back-end server comprising:
a primary token server;
a plurality of cache appliances in communication with the token server, each of which receives tokens from the token server to synchronize access to data and attributes caches of the cache appliances by revoking incompatible tokens when granting new tokens, and reading and writing data and attributes to the back-end server when tokens are revoked, the cache appliance having persistent storage in which data and attributes are stored, and the token server having persistent storage in which tokens are stored and where the cache appliance maintains its own copy of modified data and attributes, and stores them to the back-end file server upon revocation of a write token, wherein the token server produces a write data token to write data to the back-end server by the cache appliance, and ensures that no two write data tokens are granted over a single byte of any same file, wherein the token server produces write attribute tokens for files stored in the back-end server and ensures that no two write attribute tokens are granted for the same file, and wherein the token server revokes an already granted write data or write attribute token by recalling the granted write data or write attribute token if a new write data or write attribute token is requested from the token server and is incompatible with the already granted write attribute or write data token and when a write data or write attribute token is revoked, the cache appliance writes the modified version of the file's data or attributes to the back-end file server; and
a hot spare token server to which the write data tokens and write attribute tokens are mirrored, the hot spare token server replaces the primary token server if the primary token server fails and continues operation with a reconstructed token database, if the hot spare token server replaces the primary token server, the hot spare server becomes the primary token server and each write data token and write attribute token that is mirrored in the hot spare token server is revoked in a same way as when a corresponding write data token or read data token is revoked in the primary token server, the token server produces hold modified tokens for the cache appliance for the file's attributes and data, and data and attributes associated with the hold modified tokens are retrieved directly from the cache appliance having the hold modified tokens, the hold modified tokens identify the cache appliance having the hold modified tokens.

2. A system as described in claim 1 including another cache appliance where modified data and modified attributes are mirrored and persistently stored.

3. A system as described in claim 1 wherein the token server produces read data tokens and read attribute tokens that have a per token expiration time which allows them to be unilaterally revoked by the token server after the expiration time has passed.

4. A system as described in claim 1 where the token server produces batch tokens to reduce communication with the token server for shared files.

5. A system as described in claim 1 wherein dual logs, or a circular log, is used to store tokens persistently at the token server.

6. A system as described in claim 1 wherein a token server is chosen by a function including a file handle as a parameter, which maps the file handle to a plurality of token servers, with a plurality of token servers in communication with the plurality of cache appliances.

7. A method for responding to a file system protocol request in regard to a back-end server comprising the steps of:
receiving tokens from a primary token server in communication with a plurality of cache appliances;
synchronizing access to data caches and attributes caches of the cache appliances with the tokens by revoking incompatible tokens when granting new tokens;
reading and writing file data and attributes in the caches of the cache appliances holding tokens;
writing data in the data caches and attributes in the attributes caches to a back-end server when the tokens are revoked, the cache appliance having persistent storage in which the data and attributes are stored, and the token server having persistent storage in which tokens are stored;
mirroring in a hot spare token server the write data tokens and write attribute tokens, the hot spare token server replaces the primary token server if the primary token server fails and continues operation with a reconstructed token database, if the hot spare token server replaces the primary token server, the hot spare server becomes the primary token server and each write data token and write attribute token that is mirrored in the hot spare token server is revoked in a same way as when a corresponding write data token or read data token is revoked in the primary token server;
producing write attribute tokens by the token server for files stored in the back-end server, the token server ensuring that no two write attribute tokens are granted for the same file;
the token server revoking an already granted write data or write attribute token by recalling the granted write data or write attribute token if a new write data or write attribute token is requested from the token server and is incompatible with the already granted write attribute or write data token; and
producing with the token server ownership tokens for the cache appliance for the file's attributes and data to allow the cache appliance to read data from another cache appliance.

8. A method as described in claim 7 including the step of the production of a write data token by the token server for files stored in the back-end server, the token server ensuring that no two write data tokens are granted over a single byte of any same file.

9. A method as described in claim 7 including the step of persistently storing in another cache appliance modified data and modified attributes synchronously with respect to the incoming data update request.

10. A method as described in claim 7 including the step of producing with the token server read data tokens and read attribute tokens that have a per token expiration time which allows them to be unilaterally revoked by the token server after the expiration time has passed.

11. A method as described in claim 7 including the step of retrieving directly from the cache appliance data and attributes of files for which the cache appliance holds an ownership token.

12. A method as described in claim 7 including the step of the token server producing a ghost token persisting for a time period during which the token server indicates a last time in which a write data or attribute token was held for the file.

13. A method as described in claim 7 including the step of the token server producing batch tokens to reduce communication with the token server for shared files.

14. A system for responding to a file system protocol request in regard to a back-end server comprising:
a primary token server;
a plurality of cache appliances in communication with the token server, each of which receives tokens from the token server to synchronize access to data and attributes caches of the cache appliances by revoking incompatible tokens when granting new tokens, and reading and writing data and attributes to the back-end server when tokens are revoked, the cache appliance having persistent storage in which data and attributes are stored, and the token server having persistent storage in which tokens are stored and where the cache appliance maintains its own copy of modified data and attributes, and stores them to the back-end file server upon revocation of a write token, wherein the token server produces a write data token to write data to the back-end server by the cache appliance, and ensures that no two write data tokens are granted over a single byte of any same file, wherein the token server produces write attribute tokens for tiles stored in the back-end server and ensures that no two write attribute tokens are granted for the same file, and wherein the token server revokes an already granted write data or write attribute token by recalling the granted write data or write attribute token if a new write data or write attribute token is requested from the token server and is incompatible with the already granted write attribute or write data token and when a write data or write attribute token is revoked, the cache appliance writes the modified version of the file's data or attributes to the back-end file server; and
a hot spare token server to which the write data tokens and write attribute tokens are mirrored, the hot spare token server replaces the primary token server if the primary token server fails and continues operation with a reconstructed token database, if the hot spare token server replaces the primary token server, the hot spare server becomes the primary token server and each write data token and write attribute token that is mirrored in the hot spare token server is revoked in a same way as when a corresponding write data token or read data token is revoked in the primary token server, the token server produces a ghost token persisting for a limited time period after revocation of an original token upon granting of a new token conflicting with the ghost token, an indication is returned to the new token's owner, indicating that the new token would have conflicted with the original token if the new token had been requested earlier, allowing the owner of the new token to act as if the new token had been obtained earlier than it was requested.

15. A method for responding to a file system protocol request in regard to a back-end server comprising the steps of:
receiving tokens from a primary token server in communication with a plurality of cache appliances;
synchronizing access to data caches and attributes caches of the cache appliances with the tokens by revoking incompatible tokens when granting new tokens;
reading and writing file data and attributes in the caches of the cache appliances holding tokens;
writing data in the data caches and attributes in the attributes caches to a back-end server when the tokens are revoked, the cache appliance having persistent storage in which the data and attributes are stored, and the token server having persistent storage in which tokens are stored;
mirroring in a hot spare token server the write data tokens and write attribute tokens, the hot spare token server replaces the primary token server if the primary token server fails and continues operation with a reconstructed token database, if the hot spare token server replaces the primary token server, the hot spare server becomes the primary token server and each write data token and write attribute token that is mirrored in the hot spare token server is revoked in a same way as when a corresponding write data token or read data token is revoked in the primary token server; and
choosing the token server by a function which includes a file handle as a parameter using hashing, which maps the file handle to a plurality of token servers.

16. A method for responding to a file system protocol request in regard to a back-end server comprising the steps of:
receiving tokens from a primary token server in communication with a plurality of cache appliances;
synchronizing access to data caches and attributes caches of the cache appliances with the tokens by revoking incompatible tokens when granting new tokens;
reading and writing file data and attributes in the caches of the cache appliances holding tokens;
writing data in the data caches and attributes in the attributes caches to a back-end server when the tokens are revoked, the cache appliance having persistent storage in which the data and attributes are stored, and the token server having persistent storage in which tokens are stored;
mirroring in a hot spare token server the write data tokens and write attribute tokens, the hot spare token server replaces the primary token server if the primary token server fails and continues operation with a reconstructed token database, if the hot spare token server replaces the primary token server, the hot spare server becomes the primary token server and each write data token and write attribute token that is mirrored in the hot spare token server is revoked in a same way as when a corresponding write data token or read data token is revoked in the primary token server; and
leasing the read data tokens and read attribute tokens and automatically revoking them when their lease expires, which prevents read access to the data and the attributes associated with the read data tokens and read attribute tokens.

* * * * *